March 31, 1959 H. B. LAW ET AL 2,880,365

SIMPLIFIED SCANNING MEANS FOR FLAT TYPE KINESCOPE

Filed Aug. 29, 1955 2 Sheets-Sheet 1

INVENTORS
HAROLD B. LAW
HARRISON S. ALLWINE
& DONALD C. DARLING
BY
ATTORNEY

SIMPLIFIED SCANNING MEANS FOR FLAT TYPE KINESCOPE

Filed Aug. 29, 1955 2 Sheets-Sheet 2

INVENTORS
HAROLD B. LAW
HARRISON S. ALLWINE
& DONALD C. DARLING
BY
ATTORNEY 2,880,365
Patented Mar. 31, 1959

2,880,365

SIMPLIFIED SCANNING MEANS FOR FLAT TYPE KINESCOPE

Harold B. Law, Princeton, and Harrison S. Allwine, Trenton, N.J., and Donald C. Darling, Levittown, Pa., assignors to Radio Corporation of America, a corporation of Delaware Application August 29, 1955, Serial No. 531,172

8 Claims. (Cl. 315—23)

The present invention relates generally to beam scanning control means for electric space discharge devices and particularly to cathode ray beam deflection control systems and control components for flat type cathode ray tubes for use in the fields of monochrome and polychrome television.

Cathode ray tubes of general application, and particularly cathode ray tubes adapted for use in monochrome and polychrome image presentation, have been of types wherein the electron source or sources and associated deflection systems are arranged to deliver the beam substantially perpendicular to the viewing screen.

Commercially practicable cathode ray tubes have required the use of magnetic or electrostatic beam deflection systems wherein the beam was passed axially through a symmetrical arrangement adapted to impart a transverse deflection in two directions normal to each other. With such systems, beam deflection was accomplished at essentially the same point for all deflection angles. In a flat type kinescope, however, deflection is accomplished first at one of a series of points along the beam axis to impart a first transverse movement to the beam and second at one of a series of parallel lines to provide a second transverse movement of the beam.

These variable points of deflection require that the deflection fields be spacially adjustable rather than adjustable only in intensity. This presents a problem of the simultaneous control of the potential of several electrodes in a tube to provide the necessary fields for successively deflecting the electron beam along the several paths which may have no common point of departure from the original beam path.

It is accordingly an object of the present invention to provide an improved beam deflecting control means for a flat type kinescope.

It is a further object of the present invention to provide a simple, efficient and dependable means for controlling the electrode potential in a flat type kinescope to effect electron beam deflection and scanning of the image reproducing surface.

In accordance with the present invention, the beam controlling fields necessary to deflect an electron beam along paths parallel to an image screen and further selectively deflect the beam to impinge on various portions of screen are controlled by means of simple linear passive networks. These networks are energized at only two points or terminals by signal generator means which provide waveforms having characteristics to enable the simultaneous control of the potential at a plurality of circuit points.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
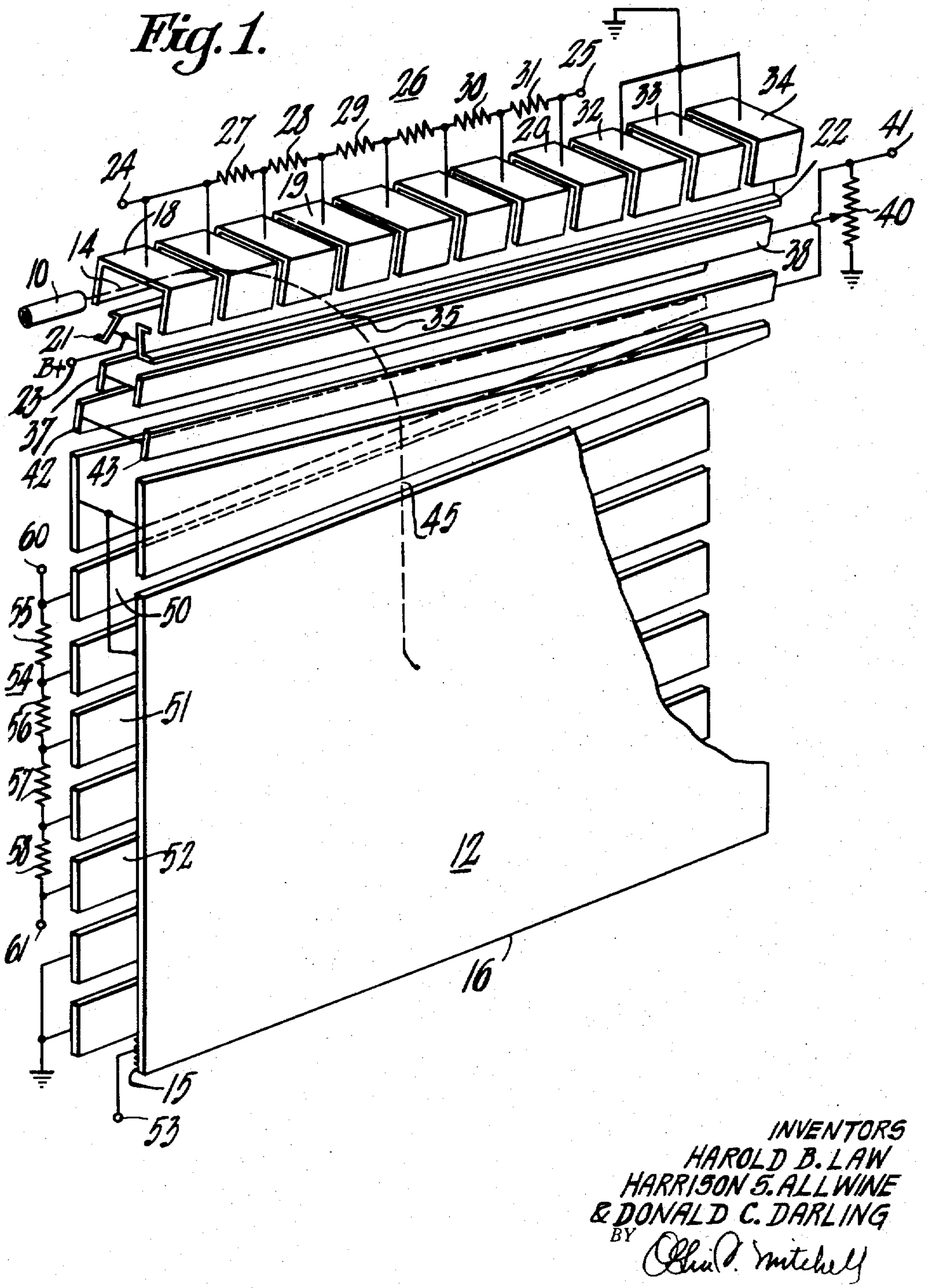
Figure 1 is a schematic exploded perspective view of certain components of a flat type cathode ray tube, wherein the horizontal deflection elements and vertical deflection plates are energized in accordance with the present invention.

The present invention, as generally illustrated in Figure 1, broadly provides means for energizing the beam deflection elements of a flat type cathode ray tube. The tube comprises an evacuated envelope, not shown, for enclosing an electron beam scanning arrangement wherein an electron beam source or gun 10 is disposed in such a manner relative to an electron sensitive image screen 12 to produce an electron beam 14 in substantially parallel proximity with the electron sensitive surface of the image screen 12. A horizontal sweep deflection system controlled in accordance with the present invention by horizontal deflection voltages is operable to deflect the electron beam 14 downwardly parallel and adjacent to the electron sensitive surface of image screen 12 consecutively and successively to various horizontally disposed portions of the image screen. Further deflection of the electron beam 14 at consecutive and successive vertically disposed levels throughout the vertical dimension of image screen 12, is provided by means of a vertical sweep deflection system which is responsive to suitable vertical sweep voltages provided in accordance with the present invention. The horizontal sweep deflection system and vertical sweep deflection system each comprise two or more sweep deflection elements arranged to accomplish the deisred deflection by virtue of deflection control voltages delivered thereto in accordance with the present invention by associated control components. The electron beam scanning arrangements as set forth in Figure 1 may provide raster scanning for either monochrome or polychrome video signal presentation or generation.

Considering the arrangement illustrated in Figure 1 in greater detail, the image screen 12 comprises an electron sensitive surface 15 coated upon a suitable optically transparent target plate 16. The low order voltage electron gun 10 is arranged above and slightly offset from the electron sensitive surface 15 and similarly positioned relative thereto to impart to the electron beam 14 an initial trajectory at a slight angle with the upper horizontal edge of the viewing screen 12.

The horizontal sweep deflection system comprises a beam control zone defined by a plurality of electrostatic deflection elements such as the elements 18, 19 and 20 and the field defining elements 21 and 22. The accelerating field for the initial trajectory of the electron beam 14 is provided by energizing the field defining elements 21 and 22 from a suitable voltage source B+ indicated at 23 and energizing the horizontal deflection elements 18, 19 and 20 from the terminals 24 and 25 through a linear passive network or voltage divider network 26 comprising the resistors 27, 28, 29, 30 and 31.

Figures 2, 3:
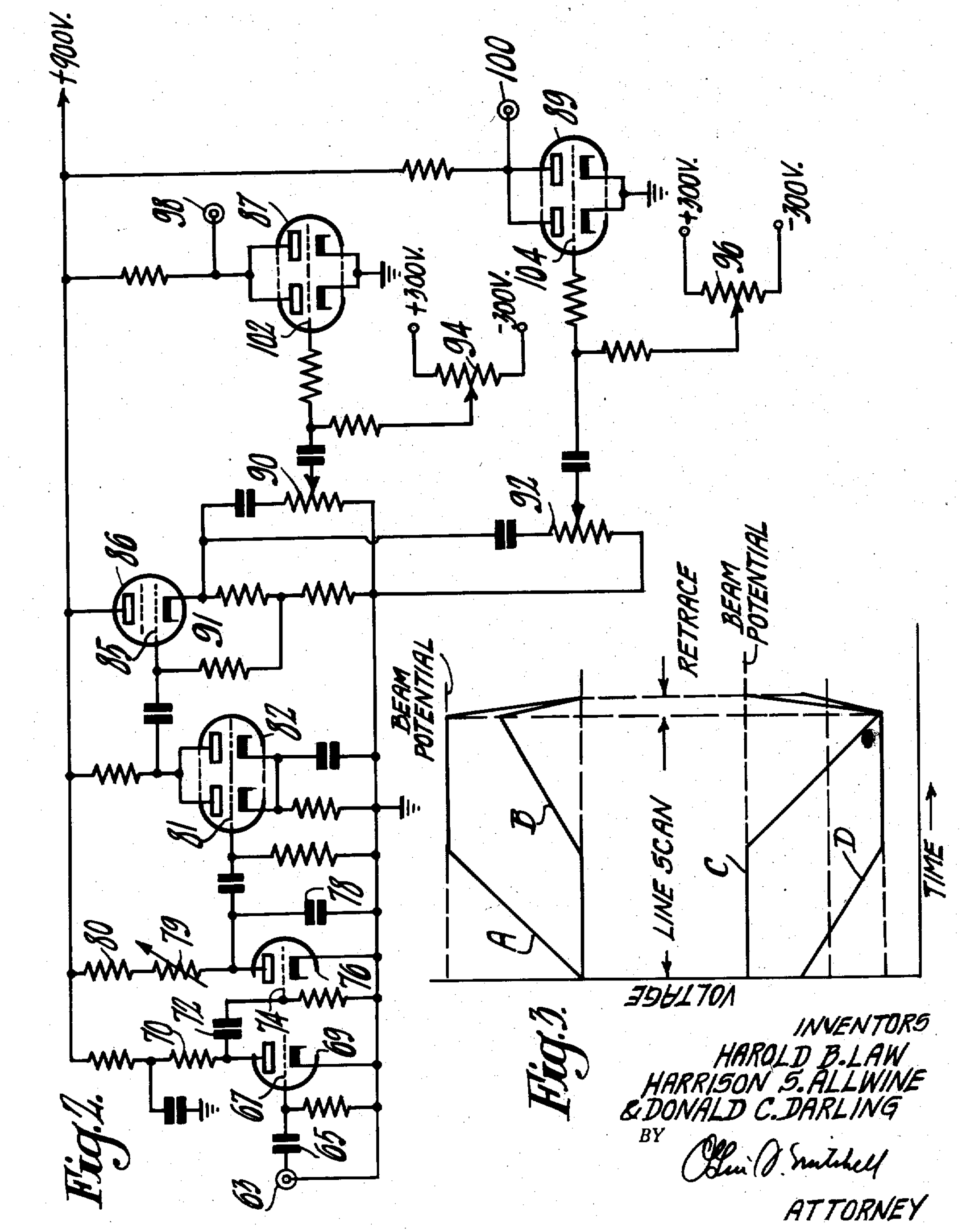
Figure 2 is a schematic circuit diagram of a waveform generator suitable for driving the deflection system of Figure 1 in accordance with the present invention.
Figure 3 is a graph showing curves which illustrate the interrelation of the waveforms which, in accordance with the present invention, may be utilized to energize the deflection system of Figure 1.

Horizontal sweep deflection control of electron beam 14 by deflection elements 18, 19 and 20 requires that the electrostatic potential of a given deflection element, taking deflection element 19, for example, is less positive than the potential of the electron gun 10. Successive low order potentials on consecutive deflection elements to accomplish delivery of electron beam 14 substantially throughout the horizontal dimension of the high voltage acceleration and focusing zone hereinafter described, are provided by means of the voltage divider network 26 when, in accordance with the present invention, suitable voltage waveforms are applied to the terminals 24 and 25. These horizontal sweep voltages, as shown by the curves A and B of Figure 3 provide field conditions necessary to affect an initiation of horizontal sweep and are of amplitudes to establish the proper potentials at the horizontal deflection elements 18, 19 and 20 for continuously providing the potential at each to cause the electron beam 14 to be deflected throughout the horizontal dimension of viewing screen 12 during the horizontal sweep period.

Upon initial deflection of the electron beam 14 and exit thereof from the initial control zone at point 35 for example, the electron beam trajectory passes between a pair of focusing anodes 37 and 38 maintained at a suitable focusing potential by means of a variable resistance focus control 40 connected between signal ground and the positive terminal 41 of a high voltage source. A pair of accelerating anodes 42 and 43 are directly connected to the positive terminal 41 of the high voltage source. The focusing anodes 37 and 38 and the accelerating anodes 42 and 43 conjunctively define a focusing and accelerating zone and operate to focus and accelerate the electron beam 14 and deliver it in successive substantially vertical beam trajectories, one such beam trajectory being shown at 45.

The present arrangement for energizing horizontal sweep deflection elements is one which permits the proper control of each while requiring a minimum of circuit elements. Moreover, the associated equipment necessary to provide the sweep voltage waveforms is of a simple nature and not unduly multiplied.

During a given instant of horizontal sweep, such as when the horizontal deflection element 19 is maintained at or near ground potential, the relative negative potential on the deflection element 19 will serve to deflect the electron beam 14 downwardly at a substantial angle and cause the deflected beam to enter the focusing and accelerating zone defined by anodes 37, 38, 42 and 43. The accelerating and focusing effect of the fields provided by these anodes will cause the beam trajectory to be further deflected and delivered adjacent the viewing screen 12 in a substantially vertical direction, as indicated at 45.

Vertical sweep of the electron beam 14 is accomplished by means of a plurality of electrostatic sweep deflection plates, such as 50, 51 and 52 which are arranged substantially parallel and adjacent to but at a distance from the viewing screen 12. The electron sensitive surface 15 is maintained at high voltage by being connected to the positive terminal 53 of a high voltage source to constitute a vertical sweep control zone in combination with the sweep deflection plates 50, 51 and 52. The deflection plates 50, 51 and 52 are respectively and individually connected to a voltage divider network 54 comprising the series arrangement of the resistors 55, 56, 57 and 58. The sweep deflection control voltages necessary for sweeping control of the deflection plates may be generated by means of wave generators similar to those discussed in connection with the horizontal deflection with due consideration for frequency and waveform characteristic. When suitable vertical sweep voltages are respectively applied to the terminals 60 and 61 and the initial potentials are properly selected to cause impingement of the electron beam 14 at the upper portion of viewing screen 12. Thus, at a given instant of vertical sweep, for example, when the deflection plate 51 is maintained at a relatively low order voltage, the electron beam 14 is deflected by the deflection plate 51 toward and impinges on electron sensitive surface 15 to cause optical activation thereof.

In the embodiment shown in Figure 1, dynamic focusing may be employed, as by superimposing increments of the horizontal and vertical sweep control voltages on a focusing means, such as in the electron gun 10 or the focusing electrodes 37 and 38. It is also possible to improve focus parameters in certain instances in arrangements as disclosed herein by suitably varying the relative spacing between portions of various elements. Thus, the focusing electrodes 37 and 38, for example, may be spaced relatively close at opposing portions thereof relatively remote from electron gun 10 and/or the vertical sweep deflection elements, for example, may be arranged at a slight angle, though still substantially parallel with electron sensitive surface 15, in order to improve the focus of the electron beam 14 at various points of impingement with electron sensitive surface 15 where maximum focus throughout the raster area is desired.

It is also to be understood that folded beam arrangements of an electron beam source for producing an electron beam having a substantial portion of the trajectory thereof parallel and adjacent an associated viewing screen and arranged for use in conjunction with horizontal and vertical sweep deflection systems may be operated in accordance with the present invention.

Moreover, the horizontal sweep deflection system above presented may be arranged along the vertical dimension of a given viewing screen by suitable arrangement of the electron beam source and associated initial sweep deflection system along the vertical dimension. Also, the sweep deflection system termed the vertical sweep deflection system is susceptible for use for deflection of an electron beam throughout the horizontal dimension of a given viewing screen in the event the initial beam sweep deflection system is arranged vertically with respect thereto.

The schematic circuit diagram of Figure 2 illustrates a synchronized wave generator which may be used to energize the horizontal deflection elements 18, 19 and 20 through a voltage divider network as provided by the present invention. Synchronizing pulses of a horizontal rate may be applied from any convenient signal source to a synchronizing signal input terminal 63 which is connected by means of a coupling capacitor 65 to the control grid 67 of an electron tube 69 utilized as a synchronizing pulse amplifier. An amplified synchronizing pulse may be derived from across a load impedance illustrated as a resistor 70 and applied through a coupling capacitor 72 to the control grid 74 of an electron tube 76 utilized as a sawtooth waveform signal generator. The linearity of the sawtooth generator is determined by the R-C time constant provided by a capacitor 78 and the resistors 79 and 80 and the frequency by the repetition rate of the synchronizing pulses applied to the control grid 74. Adjustment of the amplitude and linearity of the sawtooth wave generator is provided by means of the variable resistor 79.

Since the amplitude of the output signal from the sawtooth wave generator is not sufficient for the intended purpose, the output signal from the sawtooth signal generator is applied to the control grid 81 of an electron tube 82 utilized as a sawtooth amplifier and phase inverter. The output signal from the sawtooth amplifier and phase inverter is applied to the control grid 85 of an electron tube 86 which is connected in a cathode follower stage to provide a low impedance signal source for the voltage divider driver tubes 87 and 89. It is noted that the cathode follower stage does not provide additional phase inversion, and since the output signal from the sawtooth wave generator stage is a positive-going sawtooth wave, the output signal which is derived from the cathode 91 of the cathode follower stage is a negative-going sawtooth wave. Further additional phase inversion may, if desired, be provided by additional phase inverter stages if the output signal from the voltage divider driver tubes need be other than that provided by the arrangement illustrated in Figure 2.

The coupling networks between the cathode follower stage and the driver tubes 87 and 89 includes an amplitude and slope control 90 and 92 and a grid bias potentiometer 94 and 96. The bias potentiometers 94 and 96 provide adjustment of the threshold level for the applied sawtooth wave. This, in turn, determines the point on the sawtooth wave at which the driver tube is cut off thereby providing the maximum positive excursion of the output signal from the driver tube. As the signals thus provided are at a horizontal rate, the output signal derived from the output terminal 98 connected with the anode of the driver tube 87 may be applied to the terminal 24 on the voltage divider network 26 which is at the electron gun 10 end of the voltage divider network, and the output signal which is derived from the output terminal 100 may be applied to the voltage divider terminal 25. If, on the other hand, the output signal provided by the system ilustrated in Figure 2 is at a vertical rate, the output signals may be respectively applied to the voltage divider terminals 60 and 61.

As discussed in the foregoing paragraph, the system shown in Figure 2 may be utilized to provide voltage waveforms necessary to energize either the horizontal voltage divider network or the vertical voltage divider network. In order to accomplish this, it is only necessary to provide time constants in the system which will enable the system to operate at the desired frequency and to provide synchronizing signals of the proper repetition rate. For example, the system illustrated in Figure 2 may be operative to provide signal voltages having a repetition rate at the horizontal line frequency and may be operative to provide waveforms as illustrated in Figure 3. The curves A and B then represent respectively the voltage waveforms available at the output terminals 98 and 100. The maximum excursion of the waveforms of signal voltage available at the control grids 102 and 104 may be adjusted by means of the bias potentiometers 94 and 96 to provide at the respective control grids signals having a desired amplitude. This will provide at the output terminals 98 and 100 an output signal having a characteristic as represented by the curves A and B of Figure 3.

It is seen by an examination of the curves A and B that at the beginning of each line scan, the voltage at the terminals 24 and 25 of the voltage divider network 26, for example, is essentially at ground potential. The exact potential available at this instant is, of course, determined by the circuit parameters and by the adjustment of the bias potentiometers 94 and 96. With the horizontal deflection element 18 essentially at ground potential, beam deflection is immediately initiated, thereby defining the first vertical boundary of the raster. At this instant the voltage appearing at the terminal 24 is driven in a positive direction, as indicated by the curve A. This occurs while the terminal 25 is maintained essentially the ground potential, thereby providing a voltage divider action as determined by the resistors 27, 28, 29, 30 and 31 which results in each of the horizontal deflection elements being raised in voltage in accordance with its position along the voltage divider network 26. As the potential of each of the elements is increased by the application of the sawtooth wave signal, the fields provided by the horizontal deflection elements 18 through 19 are such as to delay the deflection of the electron beam until some later time than the initial deflection occurred in point of electron beam travel through the horizontal deflected elements.

As can be further seen from an inspection of the curves of Figure 3, the voltage applied to the terminal 24 continues to rise in a positive direction for nearly one-half the line scan interval at approximately which time the voltage applied to the terminal 25 begins to rise by virtue of the operation of the driver tube 89. This is represented by the curve B of Figure 3. The voltage applied to the terminal 25 continues to rise in a positive direction until a major portion of the particular line has been scanned, at which time the driver tube 89 is cut off and a maximum positive voltage is available at the terminal 25. Since the horizontal deflection elements 32, 33 and 34 at the end of the electron beam path are connected directly to ground, it is evident that the final deflection of the electron beam 14 is accomplished by virtue of this ground connection. At the end of the deflection for one horizontal line, the voltage applied to both the terminals 24 and 25 are rapidly driven in a negative direction to ground potential thereby accomplishing horizontal retrace. Upon the termination of horizontal retrace, the voltages applied to the terminals 24 and 25 again take the form as illustrated by the curves A and B providing a subsequent horizontal scanning by the electron beam 14.

A vertical scan and control therefor is accomplished by means of the vertical deflection plates 50, 51 and 52 under the control of the voltage divider network 59 in essentially the same manner as horizontal deflection is accomplished except for the difference in the operating frequency. Accordingly, the waveforms which may be provided by the waveform generator as illustrated in Figure 2 are essentially as above discussed in connection with the horizontal deflection, but are at a vertical deflection rate. The signals which may be applied to the terminal 60 may then be represented by the curve A of Figure 3, and the signal which may be applied to the terminal 61 may be represented by the curve B.

As in the instance of horizontal deflection, the last two vertical deflection plates may be connected directly to ground providing terminal deflection of the electron beam. In each of the instances above discussed, the deflection is accomplished first at the elements which are near the electron beam source. In other words, horizontal deflection is first accomplished at or near the horizontal deflection element 18 and proceeds in a horizontal direction through the horizontal deflection elements 19 and 20. Vertical deflection is first accomplished at the vertical deflection plate 50 and proceeds successively through the vertical deflection elements 51 and 52. The net result of this arrangement, if it is assumed that the electron gun 10 is in the upper left hand corner of the tube structure, is a raster which is scanned from left to right and from top to bottom.

However, it may be desired to provide a tube arrangement wherein the electron gun or electron beam source is in some other position within the tube structure or wherein the phosphor plate and the viewer are on the far side of the vertical deflection plates instead of the near side, so that the scanning function must be provided in a direction toward the gun source rather than away from it. This may be accomplished by means of the equipment illustrated in Figure 2 with the provision of an additional phase inverter stage. In this instance the waveforms which are provided at the output terminals 98 and 100 are the same as before except that the time base is reversed. The additional phase inverter action provides a positive-going sawtooth signal at the amplitude and slope control networks. The excursion of this signal is determined by the adjustment of the bias potentiometers 94 and 96. That is to say, the polarity of the signals applied to control grids 102 and 104 is such as to increase the conduction of each of the driver tubes 87 and 89 in accordance with the adjustments of the bias control potentiometers 94 and 96, and these adjustments may be made to provide signals as illustrated by the curves C and D.

With this arrangement of signal polarity, the initial potential of the signals available at the terminals 24 and 25 may be essentially the same as the electron beam potential. However, it may be desirable, as shown in Figure 3, to provide a different voltage excursion for each of the terminals 24 and 25 and have these voltages coincide at the maximum variation from beam potential. In any event, the potentials are adjusted to initially allow the beam to pass through each of the horizontal deflection elements 18, 19 and 20 essentially undeflected until it enters the field provided by the grounded horizontal deflection elements 32, 33 and 34. Upon the application of a negative-going signal to the terminal 24, as shown by the curve C and to the terminal 25 as shown by the curve D, the deflecting field is caused to progress from right to left, or from the horizontal deflection element 20 to the horizontal deflection element 19, to the horizontal deflection element 18, thereby causing the deflection to move from right to left.

As in the case where horizontal deflection was accomplished from left to right, the voltage applied to the terminal of the voltage divider network at which deflection is initially accomplished, may be provided with a maximum change of potential in a fractional portion of the time required for a complete line scan. After a fraction of the time for a line scan has lapsed, the voltage at the other terminal of the voltage divider network is driven in a negative direction to a maximum negative voltage which is at or near ground potential, thereby providing deflection which defines the other side of the scanning raster. This same system of deflection may also be used to accomplish vertical scanning in a similar manner.

The present invention therefore provides a novel beam scanning control means for cathode ray tube of the shallow depth or flat tube type. The provision of such means is made possible by the utilization of novel horizontal deflecting control means and novel vertical deflection control means for accomplishing beam control and positioning. Briefly, in one embodiment which embodies the generic concept, a beam source, such as a cathode ray gun, delivers a beam in substantially parallel relation with an edge of the target plate. A series of horizontal deflection elements, arranged approximately in coextensive relation with the beam path, are individually and mutually controlled through a linear passive network to deflect the beam along a continuously varying path to various portions of an area which lie substantially parallel and in spaced relation with and facing the target. A set of vertical sweep deflection plates, located to permit delivery of the beam between the target and the vertical deflection means, are mutually controlled through another linear passive network to sequentially deflect the beam towards different segments of the screen. The scan may be from top to bottom and right to left, or in any other desirable combination by the proper selection of the energizing waveforms.

Having thus described the invention, what is claimed is:

1. Cathode ray tube apparatus comprising an electron sensitive viewing screen, a horizontal sweep deflection system having a plurality of horizontal sweep deflection elements arranged side by side approximately parallel with an edge of said viewing screen and spaced apart therefrom, an electron source arranged to deliver an electron beam in a trajectory between said elements and said edge, horizontal sweep deflection control means including a first linear passive network, said horizontal sweep deflection elements being individually connected to successive points on said first linear passive network, a source of horizontal deflection waves, means coupling said source of horizontal deflection waves to said first linear passive network to deliver said horizontal waves to said horizontal deflection elements to deflect said electron beam in successive trajectories substantially parallel and adjacent to said viewing screen, and a vertical sweep deflection system comprising a plurality of vertical sweep deflection elements arranged in a plane substantially parallel to said viewing screen and spaced apart therefrom, vertical sweep deflection control means including a second linear passive network, said vertical sweep deflection elements being individually connected to successive points on said second linear passive network, a source of vertical deflection waves, means coupling said source of vertical deflection waves to said second linear passive network to deliver said vertical deflection waves to said vertical deflection elements to cause said electron beam to be further deflected toward and impinged upon said viewing screen.

2. In a cathode ray tube including an electron sensitive viewing screen, an electron source arranged to deliver an electron beam through an initial trajectory in substantially parallel proximity with said viewing screen and a sweep deflection system comprising a plurality of sweep deflection elements, a sweep deflection control means operable to control said deflection elements to deflect said electron beam in successive trajectories substantially parallel and adjacent to said viewing screen and comprising, means connecting at least one of said elements lying at the terminal end of said initial trajectory to a point of fixed reference potential, a linear passive voltage divider network having only two signal input terminals, each of the remainder of said elements being individually connected with said network, and sweep voltage supply means connected for applying a first sawtooth sweep voltage wave to one of said terminals and a second sawtooth sweep voltage wave to the other of said terminals, the repetition rate of said sawtooth voltage waves being the same, the duration and amplitude of said second sawtooth voltage wave being a fraction of that of said first voltage wave.

3. A cathode ray tube comprising an electron sensitive viewing screen, an electron source arranged to deliver an electron beam through a trajectory in substantially parallel proximity with said viewing screen, a horizontal sweep deflection system for providing a horizontal line scan during a predetermined interval and comprising a horizontal sweep control zone defined by a plurality of electrostatic horizontal sweep deflection elements arranged transversely along and adjacent to said beam trajectory, a first linear passive network including two end terminals, each of said horizontal sweep deflection elements being individually connected to said network, said control zone being further defined by field defining plates longitudinally disposed below and parallel to said beam trajectory and spaced in a direction transversely of said trajectory a distance to allow passage of the beam therebetween, horizontal sweep deflection control means operable to apply a first positive-going sweep deflection voltage to one of said terminals and a second positive-going sweep deflection voltage to the other of said terminals to thereby deflect said electron beam downwardly in successive trajectories between said field defining plates at an angle with respect to the aforesaid beam trajectory, said first positive-going sweep deflection voltage having the characteristic of attaining a maximum predetermined voltage in essentially one-half said scanning interval and remaining at said predetermined voltage for the remainder of said interval, said second positive-going sweep deflection voltage being initiated at essentially said one-half scanning interval and rising at approximately the same rate as said first positive-going sweep deflection voltage for said remainder of said interval, said horizontal sweep deflection system further comprising a plurality of opposed accelerating anodes arranged in equispaced relation transversely of said successive trajectories, said accelerating anodes serving to accelerate said electron beam when delivered through said successive trajectories to thereby deliver said beam substantially parallel and adjacent to said electron sensitive surface in successive substantially vertical trajectories substantially throughout the horizontal dimension thereof, a vertical sweep deflection system comprising a plurality of vertical sweep deflection elements, a second linear passive network including two end terminals, each of said vertical deflection elements being individually connected with said second network, and vertical sweep deflection control means operable to deliver a third positive-going deflection voltage to one terminal of said second network and a fourth positive-going deflection voltage to the other terminal of said second network to cause said electron beam to be further deflected toward said viewing screen and cause impingement of said electron beam thereon.

4. In a cathode ray tube including an electron sensitive viewing screen, an electron source arranged to deliver an electron beam through a trajectory in substantially parallel proximity to said viewing screen, a horizontal sweep deflection system comprising a plurality of horizontal sweep deflection elements to deflect said electron beam in successive trajectories parallel and adjacent to said viewing screen and a vertical sweep deflection system including a plurality of vertical sweep deflection plates arranged transversely of said successive trajectories and substantially parallel to said electron sensitive surface and offset therefrom a distance to permit said successive beam trajectories to pass between said electron sensitive surface and said vertical sweep deflection plates, a sweep control means comprising, means connecting at least one of said horizontal sweep deflection elements and at least one of said vertical sweep deflection plates directly to a point of fixed reference potential, a first voltage divider network including only two energizing terminals, means for individually connecting the remainder of said horizontal sweep deflection elements to said first voltage divider network, horizontal sweep deflection control means operable to apply a first sweep deflection voltage to one of said energizing terminals, said first sweep deflection voltage having the characteristic of rising to a predetermined maximum amplitude during a predetermined interval and remaining at said maximum amplitude for a second interval substantially equal to said predetermined interval, said horizontal sweep deflection control means further being operative to apply a second sweep deflection voltage to the other of said energizing terminals, said second sweep deflection voltage being initiated at the end of said predetermined interval and rising to an amplitude equal to a fraction of said predetermined amplitude during said second interval.

5. In a cathode ray tube including an electron sensitive viewing screen, an electron source arranged to deliver an electron beam through a trajectory in substantially parallel proximity to said viewing screen, a horizontal sweep deflection system comprising a plurality of horizontal sweep deflection elements to deflect said electron beam in successive trajectories parallel and adjacent to said viewing screen and a vertical sweep deflection system including a plurality of vertical sweep deflection plates arranged transversely to said successive trajectories and substantially parallel to said electron sensitive surface and displaced therefrom a distance to permit said successive beam trajectories to pass between said electron sensitive surface and said vertical sweep deflection plates, a sweep control means comprising, means connecting at least one of said horizontal sweep deflection elements and at least one of said vertical sweep deflection plates directly to a point of fixed reference potential, a first voltage divider network including only two energizing terminals, means for individually connecting the remainder of said horizontal sweep deflection elements to said first voltage divider network, horizontal sweep deflection control means operable to apply a first sweep deflection voltage to one of said energizing terminals, said first sweep deflection voltage having the characteristic of rising to a predetermined maximum amplitude during a predetermined interval and remaining at said maximum amplitude for a second interval substantially equal to said predetermined interval, said horizontal sweep deflection control means further being operative to apply a second sweep deflection voltage to the other of said energizing terminals, said second sweep deflection voltage being initiated at the end of said predetermined interval and rising to an amplitude equal to a fraction of said predetermined amplitude during said second interval, with a second voltage divider network including only two energizing terminals, means for individually connecting the remainder of said vertical sweep deflection plates to said second voltage divider network, vertical sweep deflection control means operable to apply a third sweep deflection voltage to one of the energizing terminals for said second voltage divider network, said third sweep deflection voltage having the characteristic of rising to a predetermined maximum amplitude during a predetermined interval and remaining at said maximum amplitude for a second interval substantially equal to said predetermined interval, said vertical sweep deflection control means further being operative to apply a fourth sweep deflection voltage to the other of the energizing terminals for said second voltage divider network, said fourth sweep deflection voltage being initiated at the end of said predetermined interval and rising to an amplitude equal to a fraction of said predetermined amplitude during said second interval.

6. In a cathode ray tube suitable for television image presentation, including an electron sensitive light producing surface, an electron source arranged to deliver an electron beam through an initial trajectory in substantially parallel proximity with said electron sensitive surface and a plurality of electrostatic sweep deflection elements arranged transversely along and adjacent to said initial beam trajectory, a beam deflection control means comprising, means connecting at least one of said elements lying at the terminal end of said initial trajectory to a point of fixed reference potential, a voltage divider network comprising a plurality of linear resistive elements connected in series arrangement and provided with only two signal input terminals, the remainder of said elements being individually connected to the junctions of said resistors in consecutive order, energizing means connected with said signal input terminals for providing at one of said terminals a sawtooth signal voltage wave, said sawtooth voltage wave having the characteristic of rising to a predetermined potential during a predetermined interval and remaining at said predetermined potential during a second interval substantially equal to said predetermined interval, whereby a deflection field is provided for deflecting said beam along successive trajectories from different points along said initial trajectory, said energizing means being adapted to apply a second sweep deflection voltage to the other of said terminals, said second sweep deflection voltage having the characteristic of remaining at an initial potential during said predetermined interval and rising during said second interval to a potential which is a fractional part of said predetermined potential, whereby said electron beam is further deflected along successive trajectories from points lying along said initial trajectory toward the terminal end of said initial trajectory and wherein the final deflection of said electron beam along successive trajectories substantially normal to said initial trajectory is provided by means of said sweep deflection elements which are connected to a point of fixed reference potential, said sweep deflection voltages being further characterized in that each returns substantially immediately and simultaneously to said initial potential thereby providing retrace of said beam deflection.

7. Cathode ray tube apparatus comprising an electron sensitive viewing screen, a beam deflection system having a plurality of deflection elements arranged side by side approximately parallel with an edge of said viewing screen and spaced apart therefrom, an electron source arranged to deliver an electron beam in a trajectory between said elements and said edge, a linear passive network, said deflection elements being individually connected to successive points along said linear passive network, a source of deflection waves, means coupling said source of deflection waves to said linear passive network to deliver said waves to said deflection elements to deflect said electron beam in successive trajectories substantially parallel and adjacent to said viewing screen.

8. In a cathode ray tube including an electron sensitive viewing screen, an electron source arranged to deliver an electron beam through an initial trajectory in substantially parallel proximity with said viewing screen and a sweep deflection system comprising a plurality of sweep deflection elements, a sweep deflection control means operable to control said deflection elements to deflect said electron beam in successive trajectories substantially parallel and adjacent to said viewing screen and comprising, means connecting at least one of said elements lying at the terminal end of said initial trajectory to a first point of fixed reference potential, a linear passive voltage divider network having only two signal input terminals, each of the remainder of said elements being individually connected with said network, and sweep voltage supply means connected for applying a first sweep voltage wave between a second point of fixed reference potential and one of said terminals, and a second sweep voltage wave between said second point of fixed reference potential and the other of said terminals.

References Cited in the file of this patent

UNITED STATES PATENTS

| | | |
|---|---|---|
| 1,962,873 | Parker | June 12, 1934 |
| 2,059,575 | Gibson et al. | Nov. 3, 1936 |
| 2,060,977 | De Boer et al. | Nov. 17, 1936 |
| 2,211,844 | Brett | Aug. 20, 1940 |
| 2,449,558 | Lanier et al. | Sept. 21, 1948 |
| 2,500,431 | Potter | Mar. 14, 1950 |
| 2,513,742 | Pinciroli | July 4, 1950 |
| 2,623,190 | Roth | Dec. 23, 1952 |
| 2,795,729 | Gabor | June 11, 1957 |
| 2,795,731 | Aiken | June 11, 1957 |